Patented Dec. 8, 1931

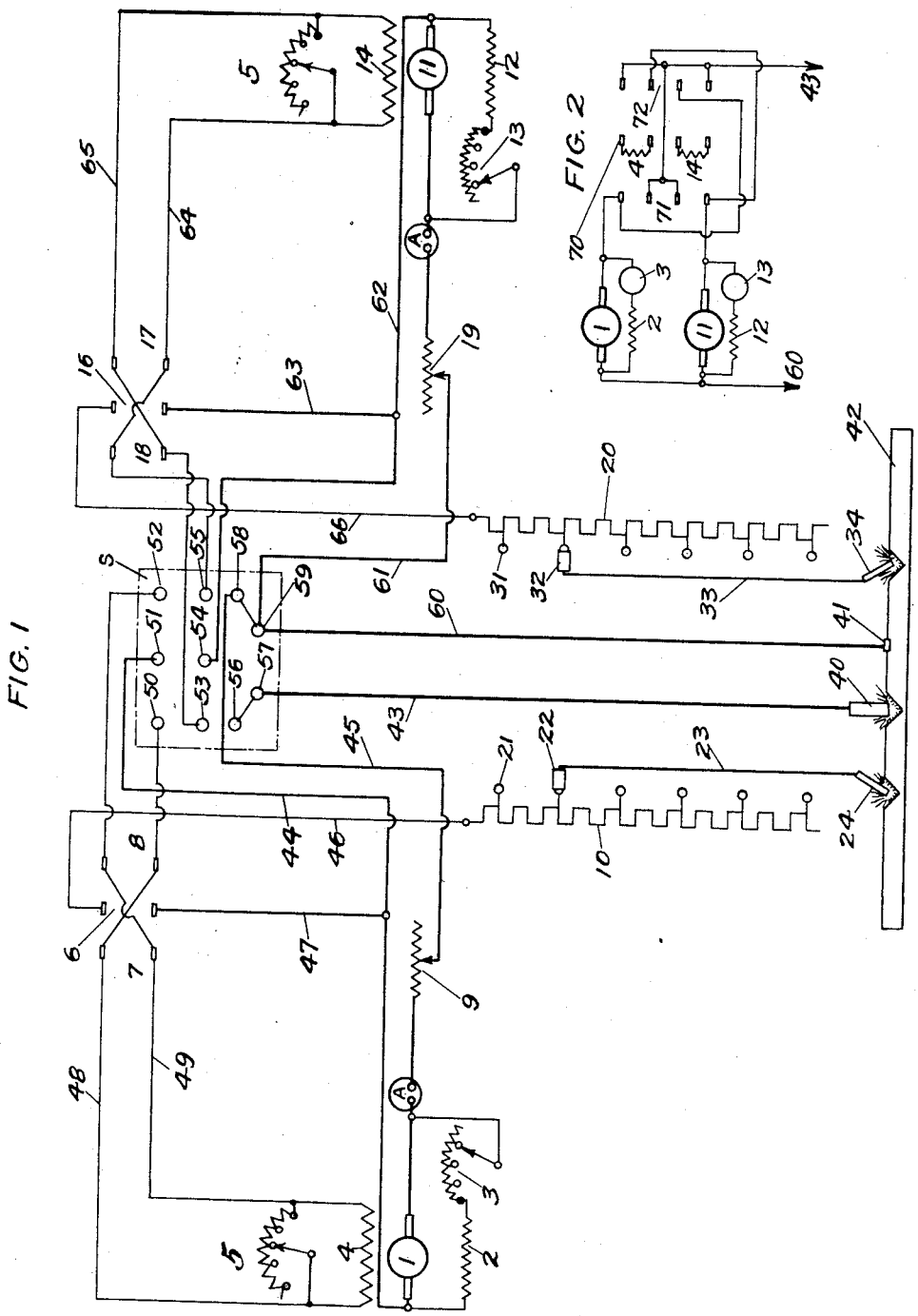

1,835,040

UNITED STATES PATENT OFFICE

CLAUDE J. HOLSLAG, OF SOUTH ORANGE, AND LAWRENCE E. WIDMARK, OF NEWARK, NEW JERSEY, ASSIGNORS OF ONE-HALF TO ELECTRIC ARC CUTTING & WELDING CO. AND ONE-HALF TO STAR ELECTRIC MOTOR CO., BOTH OF NEWARK, NEW JERSEY

WELDING SYSTEM

Application filed August 1, 1929. Serial No. 382,782.

This invention relates to improvements in a welding system wherein direct current generators are used for supplying the welding current.

Many times it is desirable to get a heavy current greatly in excess of the normal capacity of a single generator for the purpose of heavy cutting or welding at a point considerably distant from the location of the welding machines. Where a pair of welding generators are available, this heavy current may be obtained by connecting the generators in multiple, but we have found that for this class of work, it is a difficult matter to equalize the compounding of the two machines.

It is therefore the principal object of our invention to provide a new and improved method of connecting welding generators in parallel or multiple so as to obtain satisfactory and stable operation of the generators.

Another object of our invention is to provide means whereby a pair of generators which are driven by the same or different prime movers, may be operated individually, or in multiple for heavy duty work as set forth in the primary object.

Our invention is set forth diagrammatically in the attached drawing, wherein two welding generators, 1 and 11 are illustrated. These generators may be driven from a single source of power such as an electric motor or gas engine, or they may be driven by separate prime movers.

We have found that a welding set composed of two generators mounted on a common sub-base with a prime mover between them, makes a very useful welding outfit, as each of the generators may be designed to deliver the required load for a single welding arc circuit; and then when heavy cutting is required or welding at some distance from the machine, or light cutting nearby, the generators may be connected in multiple according to our improved method, as will be presently set forth.

For the purpose of illustration, we have chosen to show a generator with field windings and a control switchboard similar to that shown in Holslag Patent 1,719,112, issued July 2, 1929.

Figure 1 is a general schematic arrangement of our invention when applied to welding.

Figure 2 is a schematic arrangement of a modified form of using our invention.

Referring to the drawings, 1 illustrates one of the generators having a shunt field 2, a control rheostat 3, and a series field 4 connected to a switch 6 by means of wires 48 and 49, said switch 6 having reversing positions 7 and 8. 5 is a device which is capable of applying a partial or full short circuit across the series field 4. The switch 6 is connected by a wire 46 to a stabilizing resistance 10, having taps 21 to which may be connected a quickly detachable plug 22, connected by lead 23 to the welding electrode 24 shown in operative relationship with the work piece 42.

One terminal of the generator 1 is connected to the ammeter A and regulating reactance 9 and by lead 45, to a terminal post 58 on switchboard S. The opposite terminal of the generator 1 is connected to the switch 6 by wire 47.

Similarly, the generator 11 has a shunt field winding 12 and a control rheostat 13, a series field 14 connected by wires 64 and 65 to the switch 16 having reversing positions 17 and 18. The switch 16 is connected to the generator 11 by a wire 63 which terminal of the generator is connected by lead 62 to the terminal post 54 on the switchboard S. The generator 11 has an ammeter connected to its opposite terminal and its control reactance 19 connected by a lead 61 to a terminal 59 on the switchboard S. The switch 16 is connected by lead 66 to a stabilizing resistance 20 having taps 31 and a quickly detachable plug 32 connected by lead 33 to the welding electrode 34 associated with the work piece 42. The terminal post 59 is connected by a heavy lead 60 to the point 41 on the work piece 42, while the terminal post 57 on the switchboard S is connected by a heavy lead 43 to a cutting electrode 40.

The terminal posts 50 and 52 are connected to the switch 6, while the terminal posts 53 and 55 are connected to the switch 16.

Coming now to the operation of our welding system, let it be assumed that each of the welding generators 1 and 11 is to be operated individually. Taking first the generator 1, assume that current is coming from the generator over the lead 47 to the switch 6. With the switch in the position 7, the current then passes over the wire 49 through the series field 4, lead 48, back to the switch 6; and then by way of lead 46 through the resistance 10 and lead 23, to the welding electrode 24, returning by way of lead 60, terminal posts 59 to 58, lead 45, reactance 9, through the ammeter back to the generator 1.

Assume now that the series field 4 or a part thereof is desired to be connected in differential relationship to the shunt field 2 as set forth in the Holslag patent previously referred to, then switch 6 is thrown into the position 8, and it will be seen that the current from the wire 47 then travels over the wire 48 through the field 4 in reverse direction back to the switch 6 and to the welding electrode 24 as previously. Thus, individual regulation of the generator 1 is obtained to suit all the conditions which this generator is capable of taking care of individually.

Similarly, the generator 11 may be operated individually through the reversing switch 16, which will be clearly seen without further explanation.

When it is desired now to do heavy cutting, the generators 1 and 11 are thrown in multiple, and this is done by leaving the switches 6 and 16 in open position and resorting to cross-connections on the switchboard S, as will now be explained.

For heavy cutting or distant welding work, the terminal post 51 is connected or strapped across to the terminal post 53, 55 is connected to 56, 54 to 50, and 52 to 57. With these connections made at the switchboard, the current may now be traced as follows:

Starting from the generator 1, over wire 44, we pass from the terminal 51 to post 53, thence to switch 16, over wire 65, through the series field 14 of the generator 11, wire 64, to the terminal post 55, over to 56, then to 57 and wire or cable 43, to the cutting electrode 40, and from the fixed contact 41 through the heavy cable 60 to the posts 59—58, wire 45, reactance 9, back to the generator 1. Thus it is seen that the armature current of the generator 1 passes through the series field 14 of the generator 11.

Similarly, starting from generator 11 over the wire 62, the current passes to the terminal posts 54 to 50, switch 6 over wire 48, series field 4, wire 49, back to the switch 6, then to post 52 and to 57, cable 43, cutting electrode 40, back through the cable 60, terminal 59, wire 61, reactance 19, back to the generator 11. Thus the armature current of generator 11 passes through the series field 4 of the generator 1, and the two generators are now operating in parallel on the cutting electrode 40.

We have found that this scheme of parallel connection gives a very stable operation of generators, whereas with the ordinary parallel or equalizing connection, the load between the generators is fluctuating or "hunting" all the time, and the operation is very unsatisfactory. With our arrangement, the operation is very stable and satisfactory.

When it is desired to cut down the full output of the two generators when operating in multiple, as for instance when cutting at a point close to the generators or for light cutting, then the series field windings 4 and 14, or parts thereof, may be connected in differential relationship to their respective shunt fields, and this is done by making the cross-connections at the switchboard S as follows:

Connect terminal 51 to 55, 50 to 57, 54 to 52, and 53 to 56, leaving the switches 6 and 16 open as before. The current may then be traced from the generator 1 through lead 44, terminal post 51 to 55, lead 64, from the switch 16 through the series field 14 in reverse direction through lead 65, back to post 53—56, 57, and to the welding electrode 40, back through 60 to 59—58, wire 45, back to the generator 1.

Similarly, the current from generator 11, through wire 62, passes from the stud 54 to 52, to the switch 6 and lead 49 in reverse direction through the series field 4, lead 48, switch 6, to posts 50—57, wire 43, electrode 40, wire 60, terminal post 59, wire 61, back to the generator 11.

In any of the previously mentioned cases, the devices 5 and 15 may or may not be used, as desired, to give a further control over the series windings 4 and 14.

In Figure 2, we have shown an arrangement in which one form of control is by means of a four-pole, double-throw switch 70, instead of using the stud-strap method previously described. In this figure, when the switch 70 is in the position 72, the generators 1 and 11 are connected in multiple so the series field of one generator is excited by the armature current of the other generator. When the switch 70 is in position 71, the generators are connected in multiple, but the armature of each generator, exciting its own series field in differential relationship, is still another combination that is also obtained from the switchboard shown in Figure 1 by connecting 51 to 52, 50 to 56, 54 to 55, and 53 to 57, leaving the switches 6 and 16 open as before.

It is to be understood that the shunt field of the generators may be excited from a separate power of energy and therefore in the claims, we have broadly called this field the main field as distinguished from the series field.

It is apparent that the mechanical details for carrying our invention into practice, may be varied over wide limits.

Having thus described our invention, what we claim is:

1. In a welding system including a pair of generators having main and series fields, a separate work circuit for each generator, switching means for each generator for connecting at least a part of the series field thereof in cumulative or differential relationship with its main field, while connecting said generators to their respective work circuits, switching means for combining the output of both generators into a common work circuit, and means for maintaining stability of operation of the generators when connected to said common circuit, said last mentioned means consisting in passing the armature current of one generator through the entire series field of the other generator in cumulative or differential relationship to its shunt field.

2. Means for operating two generators having main and series fields in parallel in a common work circuit comprising; means for connecting the entire series field of one generator into the armature circuit of the other generator, and also for connecting the entire series field of each generator into its own armature circuit but in differential relation to the main field of that generator.

3. Means for operating two generators having main and series fields in parallel in a common work circuit comprising; a four-pole switch having the series field of one generator connected across one pair of switching blades and the series field of the other generator connected across the other pair of switching blades, while the work circuit and armatures of the generators are connected to the switch contacts so that when the switch is closed in one position, the series field of one generator is in the armature circuit of the other, and when the switch is in its alternate closed position, the series field of each generator is connected into its own armature circuit but in differential relation to its main field.

4. Means for operating two generators having main and series fields in parallel in a common work circuit including switching means on a connecting board, to different parts of which; the series fields of the generators, the work circuit and the armatures of the generators are connected, said switching means adapted to be manipulated so that the series field of one generator is in the armature circuit of the other or the series field of each generator is connected into its own armature circuit but in differential relation to its main field.

5. Means for operating two generators having main and series fields individually or in parallel in the same work circuit including switching means on a common connection board; to different parts of said switching means are connected; the series field of each generator, the work circuit and the armature of each generator, said switching means adapted to be manipulated so that the series field of each generator individually may be connected in cumulative or differential relationship with its own main field into the work circuit, or the series field of one generator may be connected into the armature circuit of the other generators and into the work circuit, or the series field of each generator may be connected into its own armature circuit but in differential relationship to its main field and into the work circuit.

In testimony whereof, we affix our signatures.

CLAUDE J. HOLSLAG.
LAWRENCE E. WIDMARK.